Figure 1:
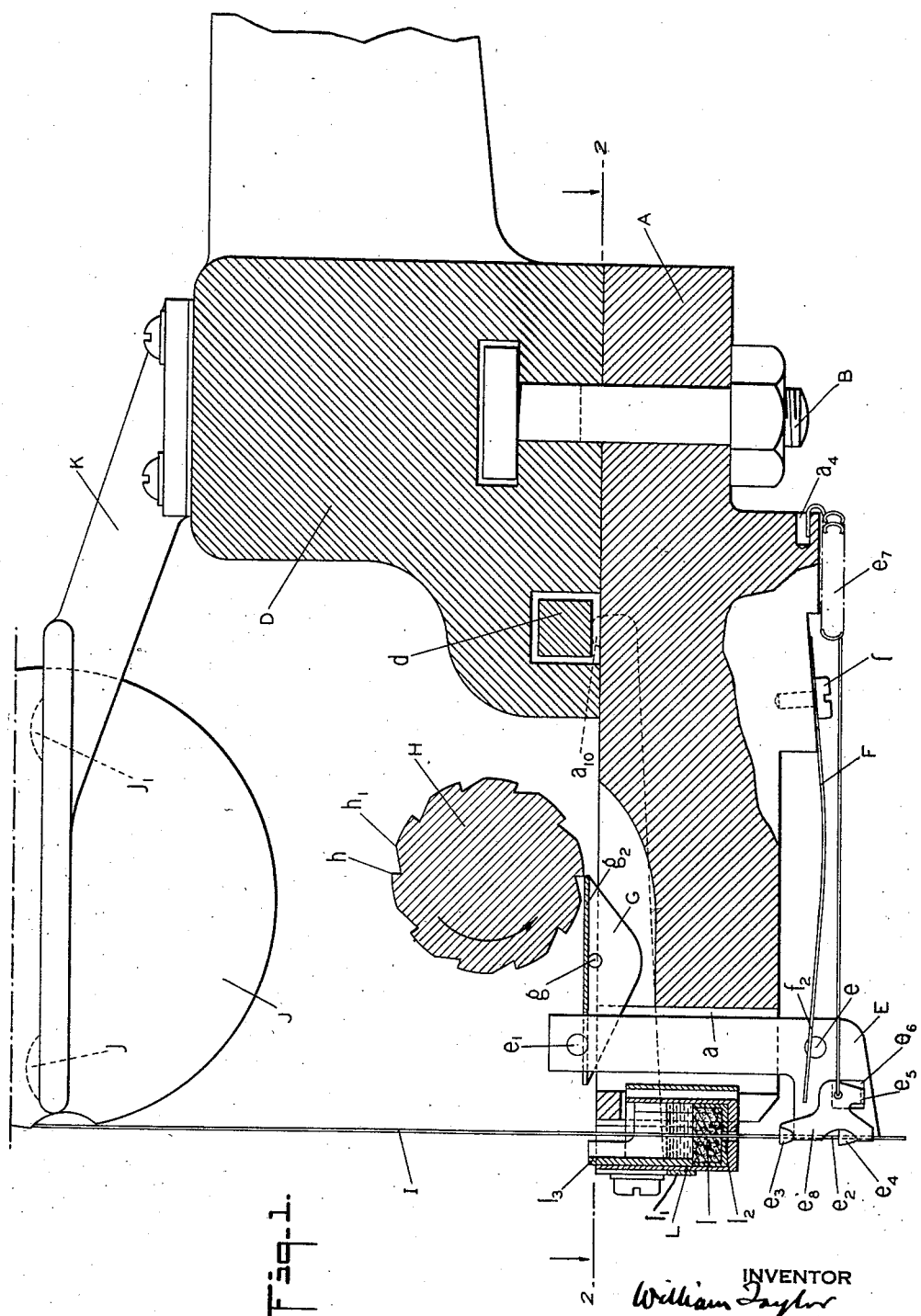

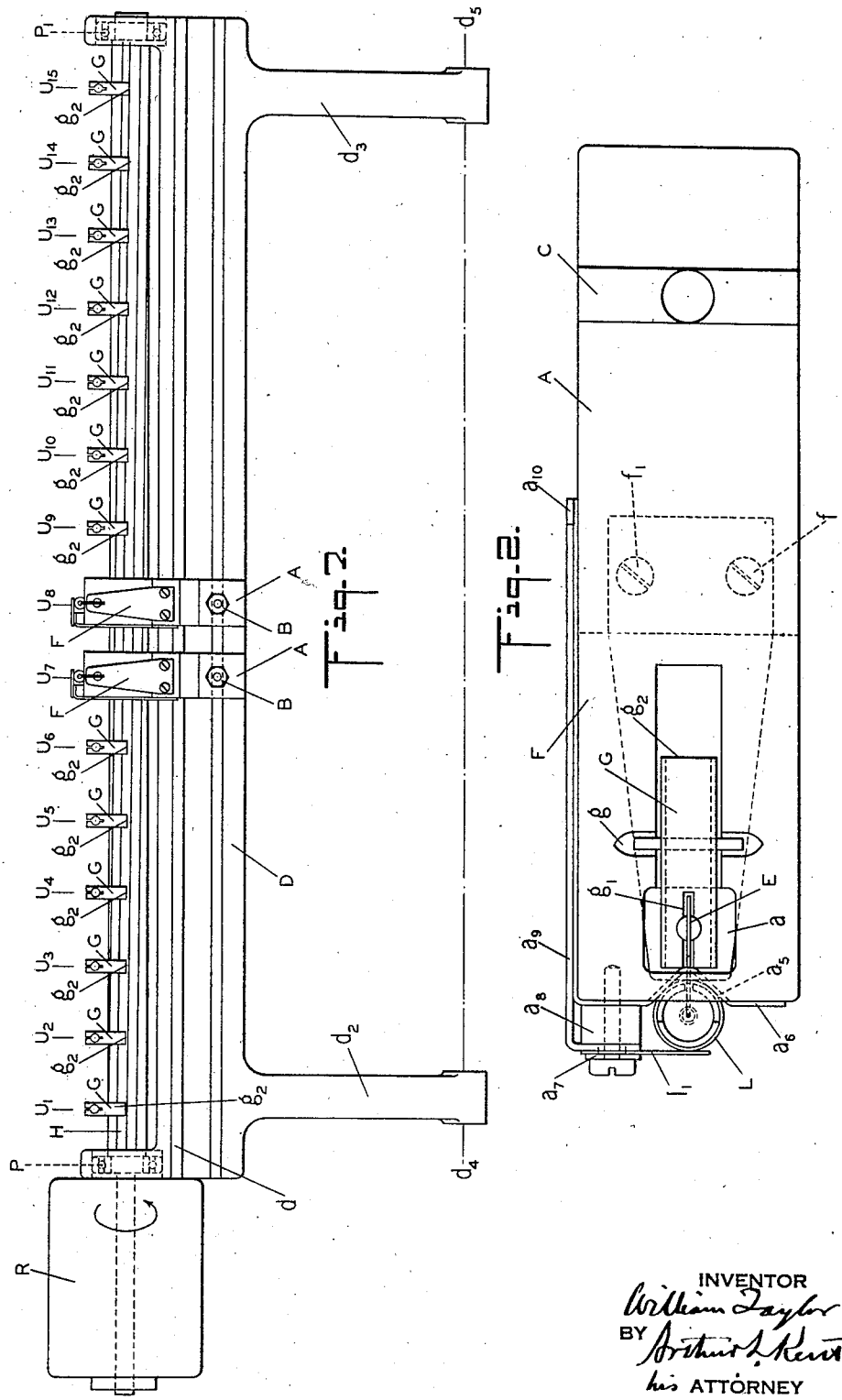

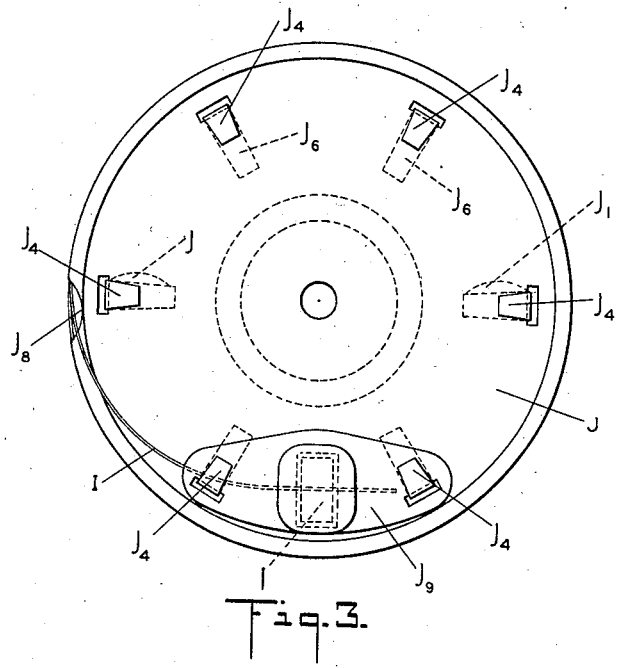
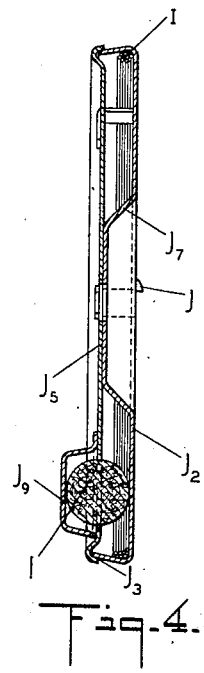
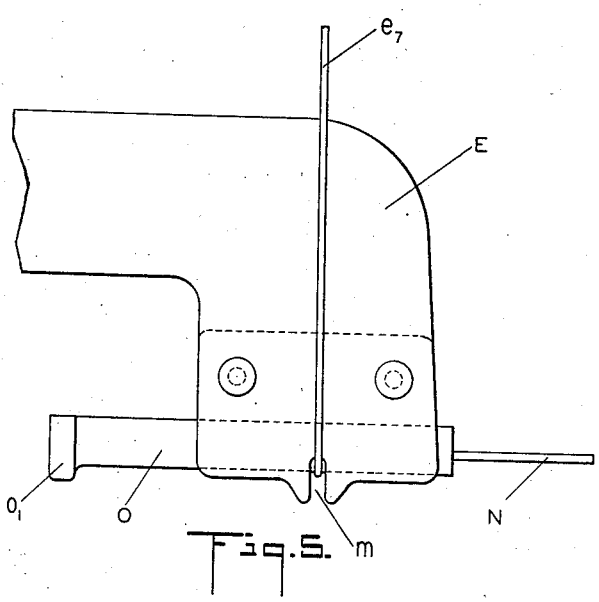
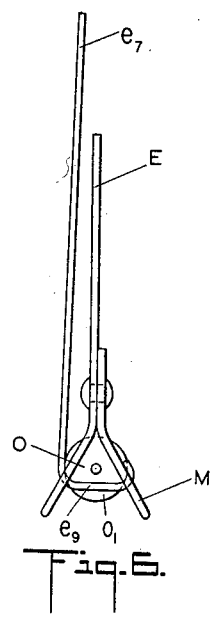

Patented Jan. 5, 1937

2,066,588

UNITED STATES PATENT OFFICE 2,066,588

METHOD AND APPARATUS FOR ELECTRICAL ETCHING

William Taylor, Leicester, England, assignor to Kapella Limited, Leicester, England, a corporation Application February 14, 1934, Serial No. 711,104
In Great Britain February 15, 1933

9 Claims. (Cl. 219—8)

This invention relates to methods and apparatus for electrically etching, or marking, articles of metal and the like by means of an electrode the end of which is presented to the surface of the object and traversed relatively thereon, either manually or by machine, the electrode being oscillated to and from the object so as to establish a succession of arcs or fluctuation of a continuous arc.

In general, etching results from this process when the object becomes burned away locally thereby, and for this purpose it is generally desirable that the electrode should have a relatively high melting temperature.

The invention consists more particularly in improvements in the method of, and means for, holding and oscillating the electrode so that it is fed to the work at the rate at which it is consumed, and in concomitant improvements in the electrode and in means for feeding the current thereto.

For etching lines on metal, apparatus has been used comprising an electrode rigidly fixed across the free end of a spring set in vibration by an electro-magnet, and the oscillating electrode, with current fed through the spring, has been presented to the object and traversed thereon either manually or by means of a machine.

Such an etching unit (as we shall hereafter designate it) has serious limitations. The amplitude of movement of the electrode, and therewith the length and duration of each arc, vary with the distance at which the unit is held from the object and, when the unit is traversed mechanically, must vary if the surface of the object be undulating or otherwise not parallel to the path of such motion of the unit. The hammer blow of the electrode against the object is considerable, since the electrode has to arrest the motion of both the spring and the holder by which the electrode is attached to the spring. This has entailed the use of an electrode of diameter many times greater than that of the line to be etched, the electrode being sharpened to a conical point, but this grows continuously in width so that uniformity of the width of line cannot be preserved. Lateral oscillation of the electrode results because, as it swings in an arc, it oscillates at most points substantially transversely to its axis.

Now according to the present invention we surmount these and concomitant difficulties mainly by:—

(1) Holding the electrode by light lateral pressure in the holder with which it is oscillated, and oscillating the holder in such manner that its movement toward the object is finally rapid and ceases suddenly, so that the inertia of the electrode carries it forward through the holder until the electrode is arrested by the object.

(2) Feeding the electrode downward through the holder so that gravity assists inertia in feeding the electrode.

(3) Increasing the inertia of the electrode when necessary, by attaching to it a supplementary weight.

(4) Leaving the electrode sufficiently free to be pushed back in the holder, if and when the surface of the object and the path along which the unit and the object are relatively traversed approach one another.

(5) Using, for etching, an electrode of uniform diameter which corresponds substantially to the width of the desired line.

(6) Using, for etching, an electrode of tungsten wire, which has a high melting temperature and is commercially available in small sizes.

(7) Applying constraint to the holder at two points whereby the electrode is constrained to oscillate substantially along its axis.

(8) Providing a non-rotating reel, to contain a coil of wire electrode, with an aperture through which the wire may be withdrawn, and a non-continuous hub to prevent successive turns of the coil from clutching one another.

(9) Feeding the current to the electrode independently of the holder by means such as a mercury cup through which the electrode passes, an interchangeably replaceable seal being provided in the cup to prevent the escape of mercury.

(10) Arranging a plurality of such etching units in one series and using means, such as a spirally grooved shaft, to determine a regular sequence of oscillation of the electrodes and thereby a regular distribution of current thereto.

(11) Oscillating the holder by mechanical means such as a rotating cam and spring-urged follower.

I will illustrate my invention by reference to the accompanying drawings in which Fig. 1 shows a side view, partly in section, of an etching unit with an electrode and case therefor, and means for oscillating the holder and for feeding the current. Fig. 2 is a plan view of the unit, and the current feeding means. Fig. 3 shows a side view, and Fig. 4 a section, of a reel to contain wire electrode, and a seal for a current-feeding mercury cup. All the above views are twice full size. Fig. 5 shows a side view, and Fig. 6 an end view, of a short electrode with a supplementary weight attached thereto, and adapted to be held in the holder. These views are five times full size. Fig. 7 shows, half full size, an underside view of an arrangement of a plurality of etching units, with a spirally grooved cam shaft adapted to oscillate the electrodes in regular sequence.

In all the figures the same reference letters are used.

A frame A may be adapted to be held in the hand but is here shown held by means of a bolt and nut B, and located by a tongue C, under a T-slotted bar D forming part of a machine. This may comprise a slide rest and a pantograph whereby a unit or a plurality of units may be traversed as desired with respect to the object. The frame A is slotted at its end $a$ for the free reception of the electrode holder E.

As shown in Fig. 1, this holder consists of an L-shaped piece of sheet steel having two holes, $e$, $e_1$, wherein are centrally placed hardened steel balls to serve as pivots.

Attached to the frame A, by screws $f$, $f_1$, is a normally flat spring F whose free end is slit at $f_2$ so as to embrace the sides of the holder E, and the slit intersects a hole which engages above the ball $e$. The spring F is under initial stress so that it tends to depress the holder E. Pivoted to and above the frame A, at $g$, is a rocker G, one end of which is drilled and slit at $g_1$, as described in the case of the spring F, for engagement with the ball $e_1$, and the other end $g_2$ of the rocker G serves as a follower to engage with a rotary cam H formed with one or more notches $h$ in its cylindrical edge. The cam rotates in the direction indicated by the arrow, and as each of its notches passes over the end of the follower the spring F moves the holder E downward at a high and accelerating velocity until the follower encounters the heel $h_1$ of the notch, whereupon the motion of the holder ceases suddenly, and it returns at a relatively slow rate.

It will be obvious that if such a unit be traversed and guided mechanically along a path over the surface of the object, and if said surface be not parallel to said path, for example if the path be in a plane and the object-surface be the bowl of a spoon, then when points of the surface encountered successively by the oscillating electrode are successively nearer to said path of traverse, the electrode may be pushed backward in the holder, and is free to be pushed backward.

The electrode I in Fig. 1, is a number of turns of wire contained in a case J, and one of its ends passes downward in the plane of the holder E to the edge $e_2$ of which it is held by means of the U-section strap $e_8$ embracing the wire and the two faces of the holder E. The strap and the holder co-operate in directing the electrode by constraining it in all directions except longitudinally.

A light tension spring $e_7$ attached to the frame at $a_4$, and to the strap $e_8$, urges the strap, and thereby holds the electrode frictionally, against the edge of the holder.

It will be seen that the spring F and the rocker G constrain the holder E, at the two points of location of the balls $e$, $e_1$, to move through the short distance necessary (which may be less than one-hundredth of an inch) in a substantially straight line parallel to the axis of the electrode.

The strap $e_8$ is provided with bell-mouthed entrances for the electrode at $e_3$ and $e_4$, and at $e_5$ with an abutment adapted to engage the bottom edge of a hole $e_6$ in the holder E, so as to prevent the strap $e_8$ moving downward on the holder.

The case J containing the electrode is placed removably in a slot in a bracket K, attached to the bar D, but insulated therefrom. The case is supported in the bracket by projecting abutments $j$, $j_1$. The case, shown particularly in Fig. 3 and Fig. 4, consists of a shallow circular box $j_2$ whose outer peripheral edge $j_3$ is turned somewhat inward so that the coils of straightened electrode placed therein tend elastically to keep themselves toward the bottom of the box. Pierced through said bottom are six equidistant radial slots $j_4$, the metal from which is bent squarely at the outer margin of each hole to form a longitudinal bar, and these six bars form, in effect, a non-continuous hub which bounds the inner side of the annular space between the bars and the edge $j_3$ of the case.

A cover $j_5$ is provided for the case and is pierced with slots $j_6$ through which the ends of the bars protrude and, after the case is filled, these are bent over the cover in order to secure it. Further with this object the case $j_2$ may have its central zone dished, as at $j_7$, so that it lies in contact with the cover to which it may be spot-welded. An aperture $j_8$ is cut in the side of the case and/or cover for the exit of the electrode I. Such a case may be used to contain a length of electrode twenty times the diameter of the case, and this can be withdrawn without any harmful resistance, and without successive coils trapping one another.

Such cases containing electrode we prefer to make with the end of the electrode projecting, as in Fig. 3, and to trap this under a temporary sheet metal cover $j_9$, held by the two ends of the adjacent bars $j_4$; and this cover may be adapted to carry, already threaded on the electrode, the interchangeable seal $l$ hereafter referred to.

Current may be fed to the electrode I through the spring F or the rocker G and the holder E, or through a flexible wire attached to the holder, but as this practice is liable to burn and damage the holder at its contact with the electrode, I prefer, in the case of a continuous electrode wire, to feed the current independently of the holder, and for this purpose provide means such as a mercury cup L, which may be attached to the frame A by means of an insulated spring clamp $l_1$, the cup being seated in a V-notch $a_5$ in the end of the frame A, and insulated therefrom by the insulation $a_6$.

The continuous oscillation of the electrode I, in the mercury cup L, is liable to wear the hole in the bottom of the cup, necessary for the passage of the electrode, so that the mercury escapes at this point; and to prevent this we may provide an interchangeably replaceable seal $l$, of which we prefer to provide one with each length of electrode and each case. The seal is preferably of elastic material such as felt, placed under compression in a thin metal cup $l_2$, pierced with a central hole to admit the electrode and centre it in the seal. In order to retain the seal $l$ with its cup $l_2$ in the mercury cup L, we provide a tubular retainer $l_3$ slit longitudinally so that it holds itself by elastic compression in in the cup L.

When the frame A is adapted to be held on a machine member such as D, we may provide an insulated longitudinal bus bar $d$, to which the mercury cup L of any unit, or each of a plurality of units, may be connected by means of the spring-connector $a_9$ electrically connected to the clamp $h_1$, and having an upturned end $a_{10}$ which makes contact with the bus bar.

Instead of feeding lengths of electrode from a reel, it is sometimes more convenient to use short lengths of electrode, and when these have not, of themselves, sufficient weight and inertia to feed them forward through the holder, we construct the electrode and the holder as shown in Figs. 5 and 6 where a short length of electrode N, of uniform diameter, is fixed in one end of a supplementary rod-shaped weight O, also of uniform, but considerably larger, diameter, and this we prefer to make of polygonal, and generally triangular, section, so that two of its faces may engage the faces of the groove in the holder E, and the third face be pressed upon by the spring $e_7$ which urges it to the holder.

The rod O is formed with a head $o_1$, so as to prevent its being projected forward through the holder indefinitely, and the length of the rod O generally exceeds the corresponding length of the holder by an amount corresponding to the original length of the electrode N. To receive such an electrode, the plate forming the holder E may be bent sideways, and a second bent plate M attached by riveting thereto, so that between their bent edges there is formed an angular groove for reception and guidance of the rod O. The said bent edges may be extended and formed with notches $m$ for location of the end $e_9$ of the spring $e_7$ which urges the rod to the holder.

In order to provide means whereby a plurality of objects may be etched simultaneously according to the present invention we arrange a number of units, as above described, in sequence, for example around a circle, or along a bar as shown in Fig. 7, and provide means by which the holders of the units are oscillated in regular sequence so as to secure a regular distribution of current to their electrodes. As shown in Fig. 7, the bar D, whose section is shown in Fig. 1, is provided with arms $d_2$, $d_{3_1}$ by which it is pivoted to the upper member of the compound slide rest about the axis $d_4$, $d_5$. This pivoting permits of raising and lowering the bar D and the units to and from the objects. Bolted by means of the T-slot, under the bar D, are a plurality of units of which, for clarity, two units namely $U_8$ and $U_7$ are fully shown in plan, while the other units numbered respectively from $U_1$ to $U_{15}$ are indicated by their rockers G.

Mounted in ball bearings P, $P_1$, in housings projecting from the bar D, is a cam shaft H adapted to be driven, in the direction shown by the arrow, by an electro-motor R, the frame of which is fixed to the bar D. The cam shaft H, is provided with a plurality of equally spaced helical grooves of such section as is shown in Fig. 1, and the angle of the helix is such that the ends $g_2$ of the rockers G, which engage as followers with the cam H, and which are set in an axial plane of the shaft, become free of the edges of the cam grooves in regular sequence from the unit $U_1$ to the unit $U_{15}$, and then commencing with $U_1$ again repeatedly.

It will be obvious that any number of units in use on the bar D may be spaced equally, and the two end units so placed, that a regular sequence of oscillation and regular distribution of current may be obtained.

What is claimed is:

1. A method of etching, comprising oscillating an electrode to and from the object to be etched, each cycle of oscillation comprising a forward movement equal to the distance between the end of the electrode and the object and a rearward withdrawal movement through a substantially fixed distance, the withdrawal movement being normally less than the forward movement to compensate for wear of the electrode.

2. Apparatus for electrically etching, comprising an electrode, means for feeding current thereto, a holder adapted to hold the electrode laterally but to permit its endwise movement therein, means by which the holder with the electrode is oscillated toward and from the object with relatively small acceleration and deceleration except at the end of the movements toward the object when the deceleration is relatively high so that the inertia of the electrode carries it forward through the holder until its motion is arrested by the object.

3. Apparatus as claimed in claim 2, in which the holder is so constrained that it oscillates bodily in a substantially straight line substantially parallel to the axis of the electrode.

4. Apparatus as claimed in claim 2, in which the holder is provided with a spring-urged strap of U-section, adapted to hold the electrode to an edge of the holder.

5. Apparatus as claimed in claim 2, in which the holder is arranged to oscillate up and down above the object to be etched, whereby gravity aids the inertia of the electrode in moving the latter through the holder until its motion is arrested by the object.

6. Apparatus as claimed in claim 2, in which the holder comprises two relatively movable parts adapted to contact opposite sides of an electrode and a spring adapted to press the two parts together.

7. Apparatus as claimed in claim 2, comprising a pair of substantially parallel links carried by a frame and respectively connected to two points of the holder to cause the latter to move bodily in a substantially straight line.

8. Apparatus as claimed in claim 2, in which the means for oscillating the holder comprises a revolving cam and spring-urged follower connected to the holder, movement of the follower in one direction being produced by the cam and in the other direction by its spring whenever the follower escapes freely over an edge of the cam.

9. A method of electrically etching, comprising moving an electrode and a support therefor laterally over the object to be etched, and simultaneously with such lateral movement producing two vertical movements of the electrode with respect to such support, first a major oscillatory movement alternately to establish and extinguish an electric arc between the electrode and the object and second a minor electrode feeding movement toward the object under an automatically limited force to ensure contact with the object on each oscillation of the electrode irrespective of wear of the electrode or inequalities in the surface of the object.

WILLIAM TAYLOR.